Figures 1, 2:
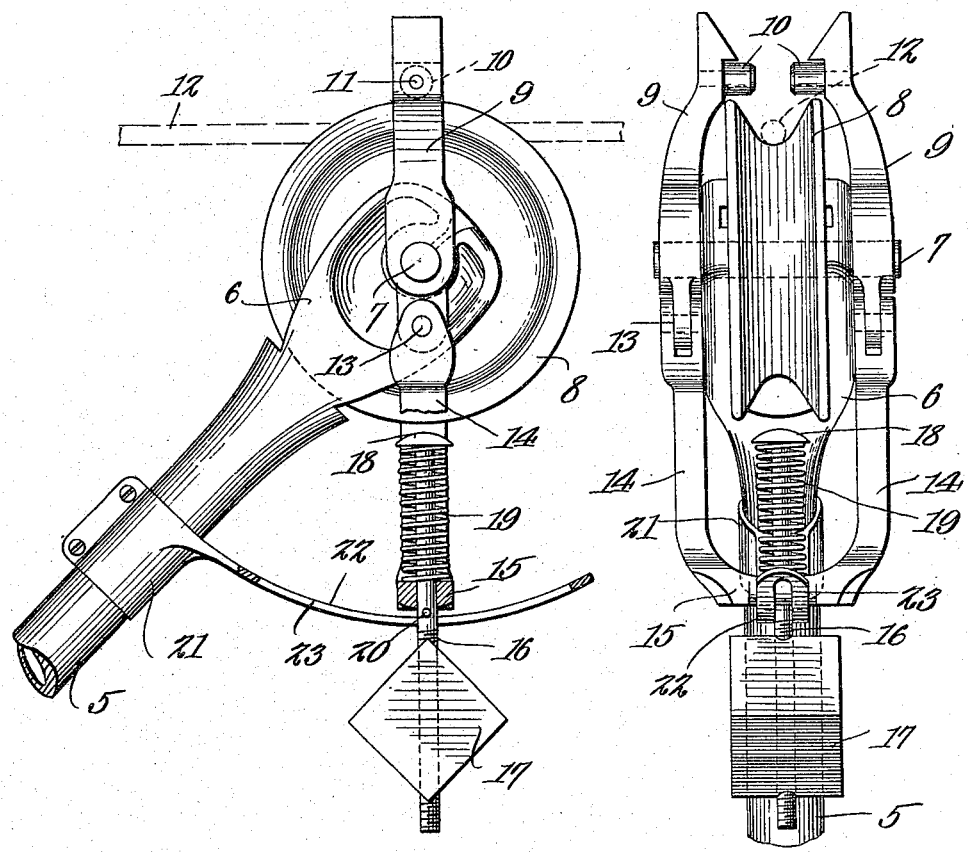

T. J. NUGENT.
TROLLEY WHEEL GUARD.
APPLICATION FILED OCT. 19, 1915.

1,176,400.

Patented Mar. 21, 1916.

Inventor
Thomas J. Nugent,
By Henry G. Burington,
Attorney

UNITED STATES PATENT OFFICE.

THOMAS J. NUGENT, OF BALTIMORE, MARYLAND.

TROLLEY-WHEEL GUARD.

1,176,400.  Specification of Letters Patent.  Patented Mar. 21, 1916.

Application filed October 19, 1915. Serial No. 56,657.

*To all whom it may concern:*

Be it known that I, THOMAS J. NUGENT, a citizen of the United States, residing at Baltimore city, State of Maryland, have invented certain new and useful Improvements in Trolley-Wheel Guards, of which the following is a specification.

This invention relates to devices for preventing trolley wheels from accidentally leaving the trolley wire, and more particularly a device of this kind which is normally in operative position, but which is pivotally mounted so that it may swing parallel to the trolley wire to clear obstructions.

The invention has for its object to provide a simple and reliable device of the kind stated, and one which can be readily applied without any changes in the structure of the trolley wheel or its support; and to this end, the invention consists in a novel combination and arrangement of parts to be hereinafter described and claimed.

In order that the invention may be better understood, reference is had to the accompanying drawing, in which—

Figure 1 is a side elevation showing the application of the invention and Fig. 2 is an end view thereof.

Referring specifically to the drawing, 5 denotes a fragment of a trolley pole having at its outer end the usual fork 6 carrying the axle 7 of the trolley wheel 8.

The guard device for preventing the trolley wheel 8 from accidentally leaving the conductor wire, comprises two arms 9 which are pivotally mounted on the ends of the axle 7 and positioned on the outside of the fork 6, so that the trolley wheel is between the arms. The guard arms are normally in erect or upright position, and their upper ends are inturned sufficiently to overhang the trolley wheel, said overhanging ends being provided with anti-friction rollers 10 carried by spindles 11 mounted in the respective arms in axial alinement. The trolley wire or conductor 12 is beneath the rollers, and the latter therefore serve to prevent the trolley wheel from jumping the wire. The guard arms 9 are normally in upright position, so that the rollers 10 are at all times in operative position above the trolley wire, and as the arms are pivoted to swing parallel to the trolley wire, they will clear all obstruction which they may encounter.

To the lower ends of the guard arms 9 are connected devices for normally holding the same erect or in upright position. These means comprise the following parts: The lower ends of the guard arms 9 extend a short distance below the axle 7, and to said ends are pivotally connected, as indicated at 13, the branches 14 of a yoke, the same being normally pendent, and the connecting portion 15 of the yoke being at the bottom. Through the part 15 loosely passes a stem 16 carrying at its lower end an adjustable weight 17. The upper end of the stem, above the part 15, has a head 18, and between said part 15 and the head 18, a spring 19 is coiled around the stem. Beneath the part 15, the stem 16 has an abutment 20 which engages the bottom of said part and prevents the upward travel of the stem through the latter.

On the trolley pole 5 is fixed a sleeve 21 having a projecting curved arm 22 which is slotted, as indicated at 23. The stem 16 passes loosely through the slot 23, and is free to move along and also up and down in the same. The weight 17 is below the arm 22.

As the yoke 14 is connected to the lower ends of the guard arms 9, the latter are normally held erect by the weight of the yoke and the parts carried thereby. When the guard arms strike an obstruction, they tilt back, whereby the yoke is drawn upward. If the arms tilt far enough to carry the weight 17 against the arm 22, the stem 16 is stopped against further upward movement, but the yoke continues to move upward against the tension of the spring 19, the yoke having a sliding connection with the stem as hereinbefore described. As soon as the guard arms clear the obstruction, they are swung back to erect position by the spring and the weight, and the parts are restored to their normal position.

The device is simple in construction and reliable in operation, and it will also be seen that it can be readily applied without any changes or modifications in the structure of the trolley wheel or its associate parts.

I claim:

1. A trolley guard comprising guard arms mounted on opposite sides of the trolley wheel and overhanging the same, said arms being pivoted to tilt parallel to the trolley wire, and means for normally holding the guard arms in erect position, said means comprising a member pivoted to the lower ends of the arms, a stem depending from said member and having a yielding connection therewith, a weight carried by the lower end of the stem, and a guide through which the stem passes, said guide being above the weight.

2. A trolley guard comprising guard arms mounted on opposite sides of the trolley wheel and overhanging the same, said arms being pivoted to tilt parallel to the trolley wire, anti-friction rollers carried by the overhanging ends of the arms, and means for holding the guard arms normally in erect position, said means comprising a member pivoted to the lower ends of the arms, a stem depending from said member and having a yielding connection therewith, a weight carried by the lower end of the stem, and a guide through which the stem passes, said guide being above the weight.

3. A trolley guard comprising guard arms mounted on opposite sides of the trolley wheel and overhanging the same, said arms being pivoted to tilt parallel to the trolley wire, and means for normally holding the guard arms in erect position, said means comprising a member pivotally connected to the lower ends of the arms, a stem depending from the member and having a sliding connection therewith, a spring opposing the relative movement of the member and the stem in one direction, a weight carried by the lower end of the stem, and a guide through which the stem passes, said guide being above the weight.

4. A trolley guard comprising guard arms mounted on opposite sides of the trolley wheel and overhanging the same, said arms being pivoted to tilt parallel to the trolley wire, and means for normally holding the guard arms in erect position, said means comprising a yoke having its branches pivotally connected to the lower ends of the arms, a depending stem having a sliding connection with the bottom of the yoke, a spring interposed between the upper end of the stem and the yoke bottom, an abutment on the stem engageable with the yoke bottom, a weight carried by the lower end of the stem, and a guide through which the stem passes, said guide being above the weight.

In testimony whereof I affix my signature in presence of two witnesses.

THOMAS J. NUGENT.

Witnesses:
E. WALTON BREWINGTON,
HOWARD D. ADAMS.

Copies of this patent may be obtained for five cents each, by addressing the "Commissioner of Patents, Washington, D. C."